United States Patent [19]

Gagliardo et al.

[11] 4,127,232
[45] Nov. 28, 1978

[54] METHOD AND APPARATUS FOR TALLYING FOOD ITEMS SELECTED ON MENUS

[75] Inventors: Michael Gagliardo, Flushing; Howard W. Schubert, Sands Point; Rahm P. Malvin, West Hempstead; Jackson Lum, Fresh Meadows, all of N.Y.

[73] Assignee: Medfare, Inc., Westbury, N.Y.

[21] Appl. No.: 847,592

[22] Filed: Nov. 1, 1977

[51] Int. Cl.[2] .................. G06K 15/00; G06K 7/10; G06K 19/06

[52] U.S. Cl. ................................. 235/419; 235/455; 235/487

[58] Field of Search ............ 35/48 A, 48 B; 235/375, 235/376, 419, 424, 435, 449, 454, 487, 492, 493; 250/555, 566

[56] References Cited

U.S. PATENT DOCUMENTS

| | | | |
|---|---|---|---|
| 2,690,301 | 9/1954 | Wilson | 235/492 |
| 3,639,732 | 2/1972 | Crain et al. | 235/487 |
| 3,715,568 | 2/1973 | Azure, Jr. | 235/487 |
| 3,754,119 | 8/1973 | Scott et al. | 235/487 |
| 3,937,929 | 2/1976 | Knauer | 235/487 |

Primary Examiner—Daryl W. Cook
Attorney, Agent, or Firm—Howard C. Miskin

[57] ABSTRACT

A system which processes menus on which food items have been selected. The menu is encoded to have a plurality of detecting paths, with a first transverse row of preassigned markings in selected areas of the paths. Additionally, there are provided uniform indicated spaces arranged in a subsequent transverse row on the menu. Each indicating space is associated with a respective food item. The user selectively places marks in the indicating spaces indicating desired food items. The system detects the preassigned markings in the first row and in response thereto initializes circuitry to register information identifying the menu, specifically the menu diet and meal. The system then detects the additional markings placed in the indicating spaces, and a recording circuit responds to these additional markings to record a count for each food item selected for that particular identified menu diet. The system then tallies the total count for each food item of all of the different types of menus.

29 Claims, 7 Drawing Figures

BREAKFAST

NAME _____ ROOM _____
DIET _____ FAT CONT. (DIET #4) □
SUNDAY S-2    Portion: Small □ Large □

- Pettijohn (Hot Cereal)
- Cream of Wheat
- Scrambled Egg
- Soft Cooked Egg
- Chilled Tomato Juice
- Cantaloupe Wedge
- Chilled Orange Juice
- Puffed Rice TOAST:
□ White
□ Whole Wheat
□ Margarine
□ Butter
□ Jelly □ Coffee
□ Tea
□ Sanka
□ 8 oz Skim Milk
□ Sugar
□ Pepper
□ Salt
□ Lemon

MARK ✗ AS DARK AS POSSIBLE IN THE BOX ⊠

NAME _____ ROOM _____

LUNCH

NAME _____ ROOM _____
DIET _____ FAT CONT. (DIET #4) □
SUNDAY S-2    Portion: Small □ Large □

- Consomme
- Roast Turkey with Diet Gravy & Cranberry Sauce
- Roast Veal with Diet Gravy
- Eggs any style with Toast
- Mashed Potato
- French Cut Beans
- Plain Beets
- Chilled Apple Juice
- Large Fruit Salad Plate with Cottage Cheese
- Tossed Green Salad with Diet Dressing
- Italian Ice
- Chilled Apricot Halves BREADS:
□ White
□ Whole Wheat
□ Margarine
□ Butter
□ Jelly □ Coffee
□ Tea
□ Sanka
□ 4 oz Skim Milk
□ Sugar
□ Pepper
□ Salt
□ Lemon

MARK ✗ AS DARK AS POSSIBLE IN THE BOX ⊠

NAME _____ ROOM _____

DINNER

NAME _____ ROOM _____
DIET _____ FAT CONT. (DIET #4) □
SUNDAY S-2    Portion: Small □ Large □

- Chicken Broth
- Broiled Lamb Chops
- Eggs any style with Toast
- Baked Sweet Potato
- Asparagus Spears
- Chilled Fruit Punch
- Large Fruit Salad Plate with Cottage Cheese
- Sliced Cucumber Salad
- Diet Cake
- Jello Cubes
- Chilled Sliced Peaches BREADS:
□ White
□ Whole Wheat
□ Margarine
□ Butter
□ Jelly □ Coffee
□ Tea
□ Sanka
□ 4 oz Skim Milk
□ Sugar
□ Pepper
□ Salt
□ Lemon

MARK ✗ AS DARK AS POSSIBLE IN THE BOX ⊠

NAME _____ ROOM _____

[1] [2] [3] [4] [5] [6] [7] [8] [9] [10] [11] [12] [13] [14] [15] [16]

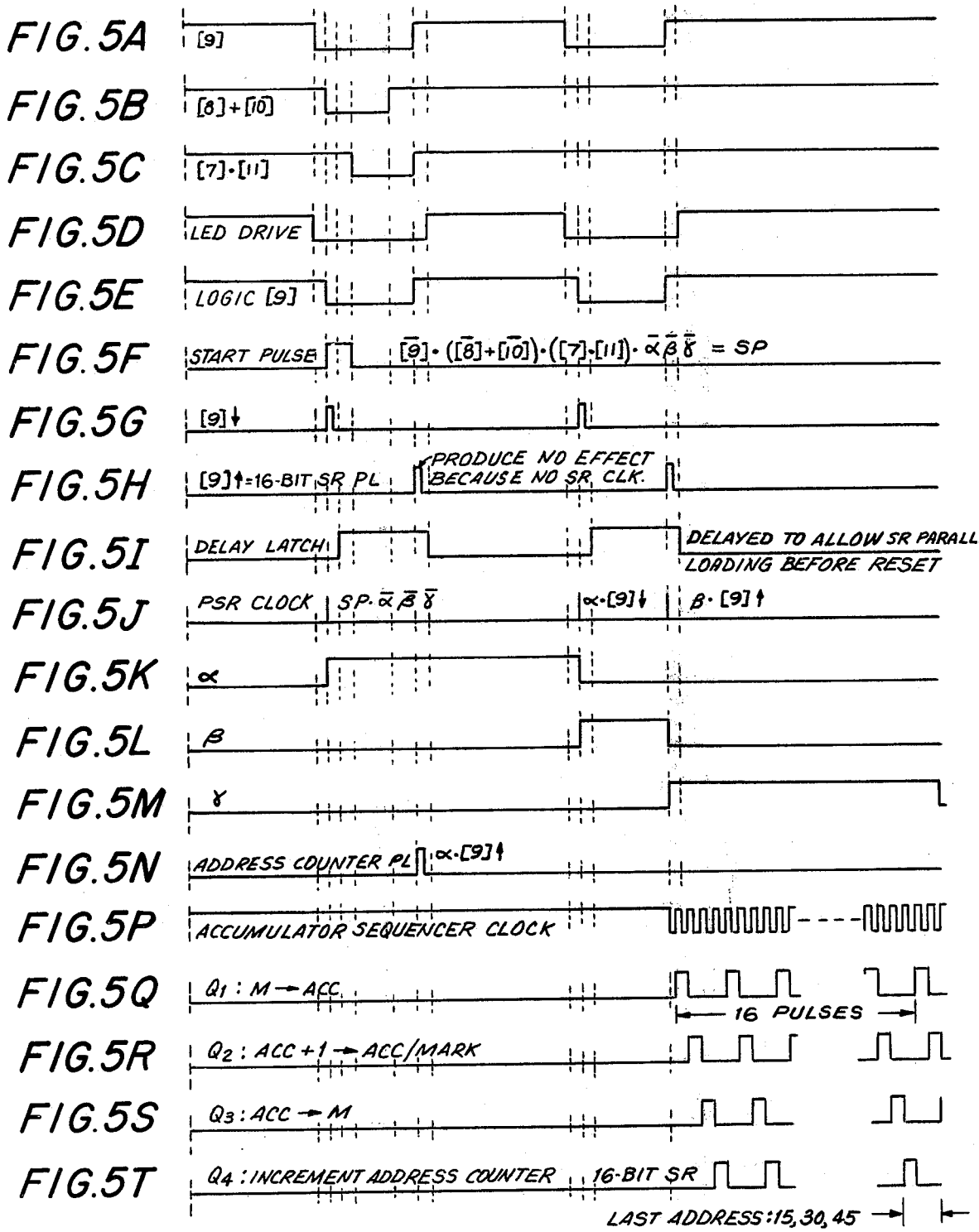

METHOD AND APPARATUS FOR TALLYING FOOD ITEMS SELECTED ON MENUS

BACKGROUND OF THE INVENTION

This invention relates to encoding systems, and more particularly to apparatus which can determine and tally food items selected on encoded menus.

Numerous institutions must serve food to their patrons. For example, restaurants, hospitals, schools, as well as government agencies, including military installations, all serve food to many people. While some of these institutions provide a fixed menu without offering any selection, it is more common to provide a menu where the individual user can select his desired choice of food items from the available listings on the menu.

When the dealing with large numbers of people to be served, and where it is required to provide a choice of menu selection, it becomes extremely difficult to prepare the proper number of portions for any particular food item, and it is very difficult to order the proper amount of food needed. For example, in a restaurant or military installation where menus are distributed prior to each meal, the menu may contain a choice of entrees, vegetables, desserts, etc. The individuals can then make their selection. However, the kitchen staff must then determine the total number of each type of entree, each type of vegetable, etc., before they can begin to prepare the meal.

In some situations, the kitchen staff prepares a fixed amount of each of the available items and distribute them on a first-come-first-serve basis. As a result, in many cases, people coming to restaurants late, can no longer obtain the full choice of menu items since these have been used up, and insufficient numbers have been prepared. The alternative is to have someone count individually each of the requested items and prepare the exact amount needed. However, when dealing with thousands of individuals, it becomes a difficult task to properly coordinate and count each food item for each meal.

The above problem becomes even more complicated when dealing with a situation such as a hospital, where different types of diets are needed. For example, some individuals require a salt free diet, others require a fluid diet, there are also low sodium diets, high protein diets, etc. In some situations there are as many as 10 or 20 individual diet variations for each meal. Furthermore, each of these diets must offer different choices of foods, and on respective diets even the same food must be prepared differently. For example, the same fish meal must be prepared differently on a salt free diet as compared to a regular diet. As a result, the total number of variations of choices including the various diets, meals, and food items, becomes extremely large and unmanageable.

An additional problem is that the printed menu itself must be prepared in a manner that the individual can easily make his selections. Accordingly, the menu must contain a full printed text of the food items and the available choices between them. At the same time, it must have the availability of permitting the individual to make a selection by placing appropriate markings on the menu to indicate his desired choice of food items for each meal.

One alternative, is to automate the process. However, the problem is how to associate particular food items with different types of menus, and how to arrange the meals. menus and different food items, in an appropriate manner, to provide simplified output results for each food item, while distinguishing the results for the different diets and meals. Futhermore, the menu itself must be maintained in a simple manner without making it overly complex. A further requirement is that the apparatus must be automatic and yet be small enough to be maintained in a kitchen without occupying too large a space.

SUMMARY OF THE INVENTION

Accordingly, it is an object of the present invention to provide a system for processing menus and tallying food items from the menus, which avoids aforementioned problems of prior art approaches.

A further object of the present invention is to provide an apparatus which can operate automatically to read encoded menus, calculate the total number of each offered food item and properly arrange the totals to display the total of each food item for each meal and menu.

Yet another object of the present invention is to provide apparatus which can receive a particular filled out menu and can appropriately determine the type of meal and diet menu being read, as well as the particular food items selected on the menu.

A futher object of the present invention is to provide an apparatus which can determine the food items selected on a menu, and which utilizes optical detectors.

Yet, a further object of the present invention is to provide apparatus which detects and tallys the total count of food items of various meals and menus, and which can selectively display the count of a particular desired food item of a meal and menu.

Another object of the present invention is to provide optical detecting apparatus and appropriate circuitry which can detect and tally food items selected from menus, and which avoids skewing errors, background noise error, and errors resulting from turn-on time delay.

A further object of the present invention is to provide an optical detecting device for detecting encoded markings on a menu, and which is only energized upon receipt of a control signal.

Yet a further object of the present invention is to provide an encoding scheme for identifying menu type and meal, which also avoids skewing errors and background noise error.

A further object of the present invention is to provide a system which detects and tallies food items selected from menus, including an initializing circuit which can identify the type of menu, and a recording circuit which then determines the count of the food items selected.

Another object of the present invention is to provide apparatus which can determine and tally food items selected from menus and which can display the count of the particular food items on a digital display, printer, or similar type of output device.

Yet a further object of the present invention is to provide a menu which can be used with apparatus for automatically detecting and tallying food items selected therefrom.

Another object of the present invention is to provide a menu which includes encoded markings and indicating spaces, the markings identifying the type of menu and the indicating spaces available for the entry of marks representing food items selected by the user.

A futher object of the present invention is to provide a menu for use with apparatus that automatically detects and tallys food items, wherein the menu includes an improved encoding scheme identifying the menu, meal, and food item selected.

Still another object of the present invention is to provide a method of determining and tallying food items selected from menus.

Another object of the present invention is to provide a method of detecting markings on a menu which identify the type of menu, and then detecting additional markings on the menu identifying food items selected.

These and other objects, features, and advantages of the invention, will, in part, be pointed out with particularity and will, in part, become obvious from the following descriptions of the invention, taken in conjunction with the accompanying drawings, which form an integral part thereof.

Briefly, there is provided a menu which includes a plurality of detecting paths across the menu. A first transverse row across the detecting paths contains preassingned markings in selected paths. The markings identify the menu by means of an encoding scheme and includes information about the diet types as well as the meal. A uniform way of indicating spaces are arranged in a subsequent transverse row across the detecting paths. The spaces are available for a user to select desired food items by placing an appropriate mark in the respective space. Each indicating space is located in a respective one of the detecting paths and each is associated with a respective food item.

A system is provded for processing the menus and tallying the food items selected from the menus. The menus are individually fed from a batch to a detection unit which can detect markings on the menu. An initializing circuit responds to the detection of the preassingned marks in the first row across the menu. The initializing circuit encodes the preassigned markings to obtain a particular combination of marks including the presence and absence of certain marks, in order to provide an initializing start pulse. The initializing circuit then determines and identifies the menu type and meal, and places the information in an address counter.

The detecting unit then proceeds to detect the additional markings in the subsequent row which identify the food items selected. A recording circuit enabled by the initializing circuit, responds to this detection and records a count for each food item selected. The address counter of the initializing circuit selects the appropriate part of a memory unit which corresponds to the particular menu type and meal. The counts recorded are then incremented to the previous counts stored in the memory locations identified by the address counter.

After the entire batch of menus have been read, the memory is then indexed and a complete tally of the total count of each food item for every meal and menu type is then obtained, which count can be displayed appropriately.

BRIEF DESCRIPTION OF THE DRAWINGS

In the drawngs:

FIG. 3 is a typical menu for use with the processing and tallying system of the present invention;

FIG. 5, including 5a through 5P, and 5Q through 5T, is a timing diagram useful in explaining the operation of the block diagram shown in FIG. 4;

In the various drawings, like references designate like parts.

DESCRIPTION OF THE PREFERRED EMBODIMENTS

Figure 1:
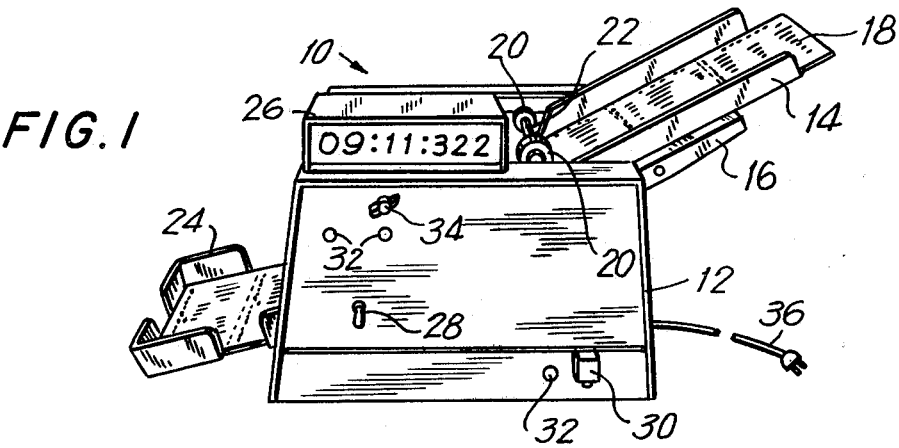
FIG. 1 is an isometric view of the processing and tallying apparatus of the present invention.

Referring now to FIG. 1, the apparatus for processing menus and tallying food items selected from the menus, is shown generally at 10 and includes a housing unit 12 which contains the various electronic components and mechanical parts needed for carrying out the present system. An input tray 14 is supported on a base plate 16 coupled to housing 12, on which a stack of menus 18 can be placed for feeding into the apparatus. Rollers 20 placed on a bar 22 individually feed the menus into the apparatus. The bar 22 extends into the side walls of housing 12 and is driven by means of a motor within the housing. An output tray 24 extends from the lower end of the housing and receives the menus after they have been processed and tallied. Both the input and output trays are angularly placed with respect to the housing to facilitate entry and exit of the menu and avoid their bunching and bending.

Upwardly extending from the top of the housing 12 is a digital display unit 26 upon which is displayed the output tally. The display contains three sections; the left section providing a two digit display representing the menu type; the next section is a two digit display representing the particular food item number on that menu type; and the last three digits display the tallied count of the particular food item. For example, as shown, the 9th diet menu is being displayed with the 11th food item on that diet menu requiring 322 individual platters or servings.

Available on the front of the housing 12 is a main ON-OFF toggle switch 30, a process/tally switch 28, indexing push buttons 32 for selectively choosing the particular menu and food items to be displayed, and a knob control 34 for selecting display modes. A power cord 36 extends from the housing for connection to a power source to energize the apparatus.

Figure 2:
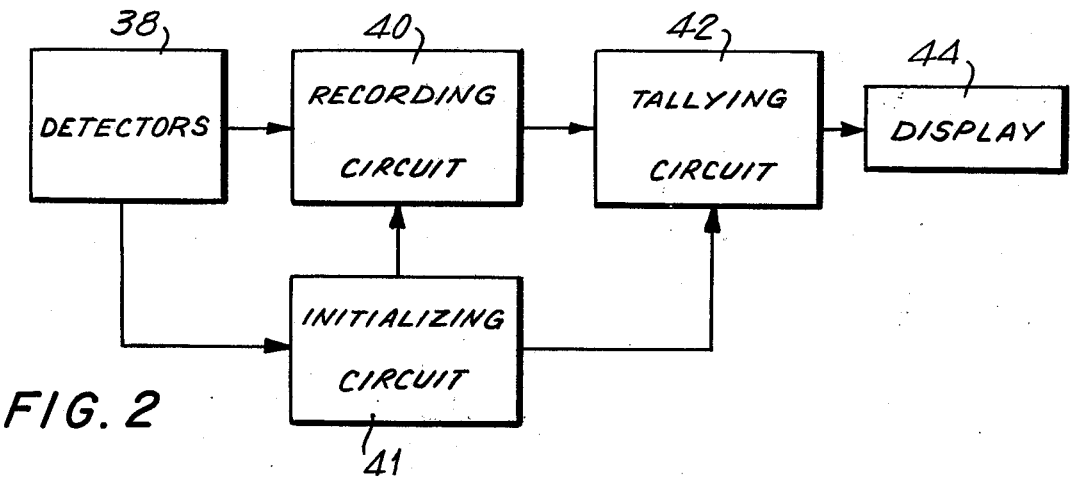
FIG. 2 is a block diagram of the basic system of the present invention.

Referring now to FIG. 2, the basic conceptual approach of the system can be appreciated. The menus contain encoded information identifying the menu type and the particular meal of the menu. Additionally, spaces are provided on the menu wherein the user can enter marks identifying selections of the food items desired. A menu containing such markings is fed to a detection unit 38 containing a plurality of detectors positioned to be able to detect the markings on the menu. The detectors produce output signals representative of the preassigned markings on the menu which identify the menu type and meal. These signals are sent to an initializing circuit 41 which first recognizes a particular code on the menu to produce an initialization pulse. The initializing circuit 41 also decodes the information concerning the type of menu diet and the meal, and stores the information in an address counter. It then enables the recordng circuitry 40. The menu continues its movement past the detectors which then detect the additional markings identifying the particular food items selected by the user. This information is then sent to recording circuit 40. The address counter of the initializing circuit 41 serves to address a particular portion of a memory in recording circuit 40, which contains memory locations for all of the available food items for all of the menu types. The address counter selects that part of the memory relating to the menu type which is currently being read. The recording circuit takes the previous counts for each of the food items for the particular menu type as was stored in the memory, and updates the counts by the additional counts presently determined from the particular menu currently being read. It then restores the updated counts back into the memory locations for the particular food items.

After all of the menus have been read and all the information updated in the memory, the tallying circuit 42 reviews the information stored in the memory, associates each food item with its particular corresponding meal and diet menu type code and combines the information in a manner to have it ready for display on the display 44. This display can either be an optical digital display, a printout, or other type of display. Furthermore, the information can be directly fed into a computer.

For a better understanding of the operation of the system, reference is now had to FIG. 3 where there is shown a typical menu which is utilized together with the apparatus of the present invention. The menu, shown generally at 50, contains 3 panels, identified as panel 52 for breakfast, panel 54 for lunch and panel 56 for dinner. As shown in the heading on each panel, the diet is numbered diet #4 and relates to a fat content diet. Other diets would have identifying numbers such as diet #5 relating to a fluid diet, diet #7 relating to a low sodium diet, etc. The menu can also be provided with a day printed on it, such as Sunday, and a special menu number, such as S-2. However, it is not the printed words which are read by the apparatus, but the encoded information, as will be explained. The menus are interconnected along perforated lines 58, 60, so that each panel can be separated. Of course, it is understood that there need not be three separate panels and even a single panel identifying a single meal can be utilized.

The menu is divided up into a number of detecting channels which are identified at the extreme left by numbers placed in brackets to indicate that they are channel designations. These channel designations are not included on the printed menu but are only added for identification purposes for the present description. These channels would correspond to optical detectors positioned to detect information along the respective 16 channels. A first row of encoding markings is printed transversely across the channels, with specific marks being placed in specified channels. There is also provided a second row 64 containing individual boxes, respectively positioned in each of the channels with a black mark contained only in the center channel 9. Channel [9] is used as the control channel and is present in each row to be detected.

Referring now to the first row 62, channel [8] and channel [10] are utilized to identify the particular meal, in accordance with the following code. Lunch is identified by "10", dinner is identified as "11" and breakfast is identified as "01". This can be noted in the various panels where the first panel 52 designating breakfast has a black marking in channel [8] with no marking in channel [10]. Similarly, on panel 54, the lunch code has a black marking in channel [10] and no mark in channel [8]. Dinner is identified with a marking both in channel [8] and channel [10].

The diet number representing the menu type is designated by a binary word utilizing channels [12] [11] [7] and [6]. Thus, for the present diet menu #4, the code in binary words is "0100". This code is entered one in each of the three panels of the menu. In each panel there is a blank space under the channel [12] [7] and [6]. Under the channel [11] there is a black marking indicating the binary word "0100". It is understood that for other diets a similar binary work would be utilized. For example, for the low sodium diet #7, there would appear a "no" mark under channel [12] with black markings under channels [11] [7] and [6]. This would designate the binary work "0111". Similarly, for the fluid diet #5, there would appear a black marking in channels [11] and [6] with no marking in channel [12] and [7] representing the binary words "0101". It is noted that this same diet code appears in all three panels since all three panels relate to the same menu.

Although markings are placed in some of the other channels, haphazardly, these are only dummy codes which are used to mask the actual encoding scheme being utilized. As will be appreciated later on, during the detection of the codes identifying the menu type and meal, only information from channels [6] through [12] are utilized. None of the other markings are used in the apparatus to be described.

It is noted that in this first row of markings, some of the marks occupy the front portion of the row, such as the mark in channel [8]. On the other hand, some of the marks occupy the rear portion of the row, such as the mark in channel [11]. The reason for utilizing this prearranged scheme is to avoid skewing errors and noise errors which might result from the paper edge of the menu. As will be explained hereinafter, the apparatus of the present invention is arranged to produce an initial start pulse at the occurrence of a marking in channel [9] in combination with the presence of a marking in either channels [8] or [10] as well as the absence of a marking in channels [7] and [11]. Channels [8] and [10] are utilized to designate the meal code. Accordingly, there will always be a mark in at least one of those two channels corresponding to one of the three meals, and therefore the meal markings are placed forward of the row. Channels [7] and [11] are utilized to designate the diet code and depending upon the diet number some of those channels may be utilized. However, by placing the diet markings at the rear portion of the row, when the optical detectors read the front part of the row they will find the absence of markings in channels [7] and [11]. This is because even if markings are present in those channels, they will appear at the rear part of the row. As a result, when the particular combination occurs, a start pulse is given and the apparatus commences operation. If the menu were to be in a skewed direction, at the time the optical detectors sense the mark in channel [9] and if the menu is skewed, then the rear portion of either channel [7] or [11] would appear and markings in those channels would be detected. At the same time, the forward portions of channels [8] and [10] might be missed and the absence of a mark in those channels would be detected. As a result, no start pulse would be given. In this way, errors are avoided which might be caused by a skewed entry of the menu. Thus, all meal codes are forward, and all diet codes are rearwards. This avoids miscellaneous markings, perforations, paper edges and skewing error.

Following the preassingned markings is a subsequent row containing boxes. As indicated in the instructions at the bottom of each menu panel, the user is to enter a mark in the box next to the desired food item. A box is provided in each of the channels, with the exception of channel [9]. Thus, a total of 15 boxes are provided to accommodate a total of 15 food items in each meal. As shown in the breakfast meal, entry has been made for the food item 2, the cream of wheat, and item 10, the chilled tomato juice.

The marking in channel [9] is utilized to turn on the optical detectors, as will be hereinafter explained. It is noted, however, that the length of the marking of channel [9] in the second row is less than the size of the boxes. Thus, the optical detectors will only turn on for the period of time that the black marking in channel [9] is present. As a result, the detectors will not turn on at the beginning of the boxes nor will they turn off at the end of the boxes, but will only be on for the middle portion of each box. Therefore, errors are avoided in that the border of the black box is excluded from detection and only the marks within the box are detected. Similarly, since not all marks entered into the box will be perfect from edge to edge of the box border, by detecting only the middle portion, enough of the mark can be properly detected to identify the desired food item.

Since four binary positions are provided for the diet code, a total of 16 different diet formats can be used. Furthermore, a total of 45 different food items are available on each diet format. Furthermore, on a given day there may be a few thousand patients in a hospital filling out these menus. Nevertheless, with the following described apparatus, all of the food items can be properly counted and tallied so that the correct number of each food item will be known in order to prepare the food in advance.

Figure 4:
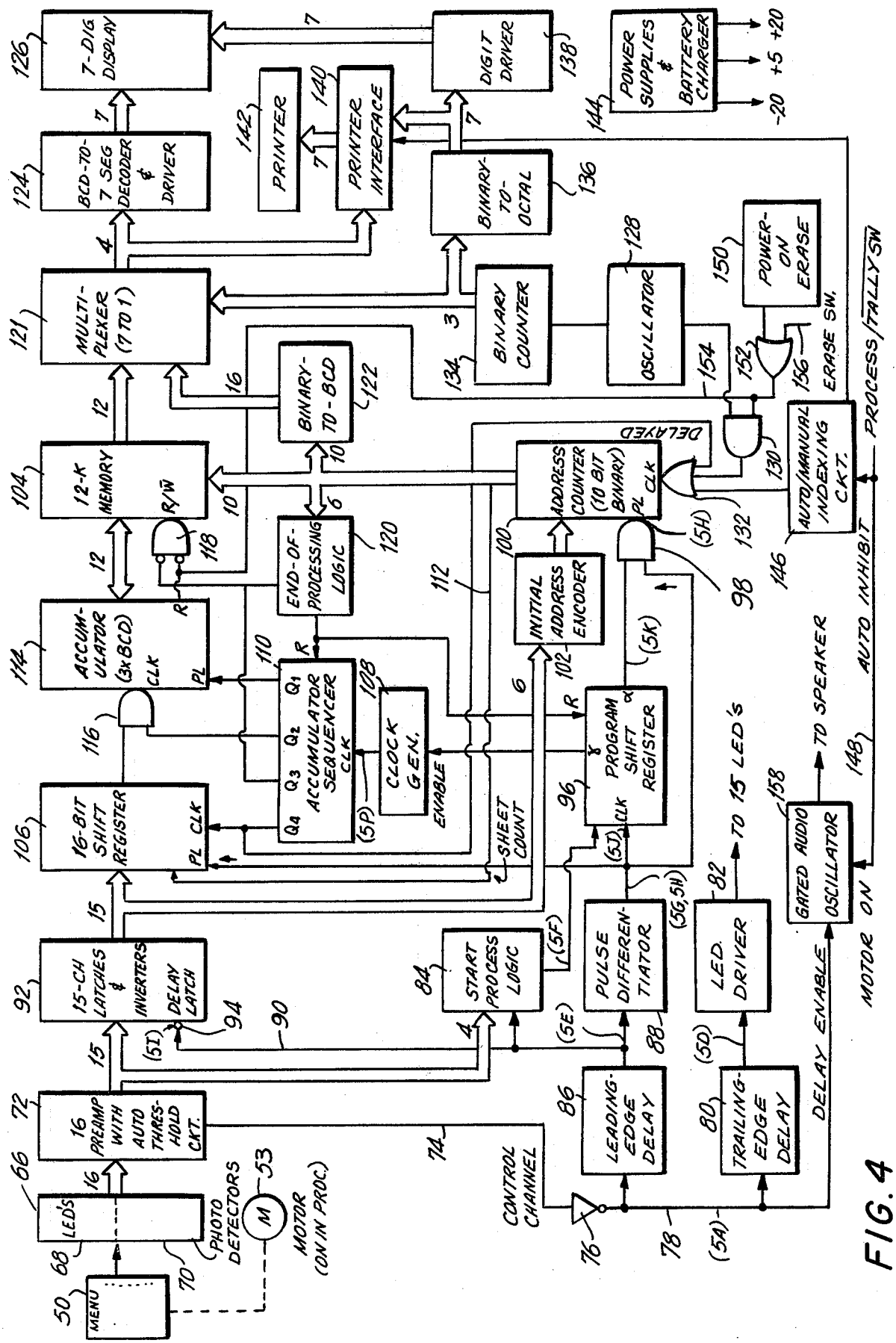
FIG. 4 is a detail block diagram of the processing and tallying system of the present invention.

The apparatus of the present invention will now be described in detail with respect to FIG. 4, together with the timing diagram of FIG. 5. The menu 50 is driven by means of a motor 53 past a series of 16 detectors 66. The detectors include 16 light emitting diodes 68 which are respectively focused onto the 16 channels of the menu. Light is reflected from the 16 channels of the menu and is detected by means of photodetectors 70 so positioned to receive the light from the respective 16 channels. When a mark is present in a particular channel, little or no reflected light will be detected. On the contrary, with the absence of a mark, sufficient light will be detected by the photodectors. As a result, logic 1's and 0's can be detected by means of the LED- photodetector arrangement.

However, some detectors will receive more light than others, depending upon the size or darkness of the marks made by the users. Therefore, there will be substantial variations in the outputs of the photodetectors. As a result, the outputs from the 16 photodetectors are respectively passed through 16 corresponding preamplifiers 72, each provided with an automatic threshold circuit.

The preamplifiers amplify the outputs of the photodetectors and provide individual thresholds for each photodetector, whereby a sufficient distinct level between light and darkness can be achieved to determine a logic value. The automatic threshold circuits will be described hereinafter.

In practice, of the 16 photodetectors, only the one occupying the channel [9] position is active when the motor is turned on. All the other photodetectors are de-energized. If all of them would be constantly driven, there would be a tendency for them to burn out. Thus, the only one that is kept active is the one corresponding to channel [9]. As a result, more current can be fed to the LEDs when they are turned on and thereafter their light emitting can be made brighter to achieve more distinct detection.

When the particular photodetector in channel [9] detects the presence of a mark, that mark is amplified through its corresponding amplifier, with automatic threshold circuit, and the output sent on line 74 through an inverter 76 to control the proper polarity. The resulting pulse on line 74 is shown in FIG. 5A as the channel [9] pulse which is the pulse resulting from the presence of a mark in channel [9] on the menu. The pulse is set to a trailing edge delay 80 which produces a pulse shown in FIG. 5D. It is noted that the pulse commences at the same time as the occurrence of the marking in channel [9]; however, it lasts longer than the termination of the actual channel [9] marking. This pulse is then sent to the LED driver circuit 82 which turns on all of the other 15 LEDs to detect all of the information in the full 16 channels on the menu.

It will thus be seen that as soon as a marking is seen in channel [9] by the photodetector arranged to detect information in that channel, all of the photodetectors will be turned on. However, the light emitting diodes will remain on longer, even after the actual channel [9] marking has stopped. The reason for this is that if the light emitting diodes would be immediately shut off, the photodetectors would immediately see black. If the remaining logic circuitry would still be active, it might misinterpret this as being new information. As a result, the light emitting diodes are kept on until the other detecting circuitry is subsequently turned off.

The information from the first row of markings containing the meal code and the diet menu code is then contained in the preamplifiers 72. As heretofore described, a particular combination of the presence and absence of pulses is first detected at the beginning of this row. More specifically, channels [8] and [10] are examined for the presence of a marking, and channels [7] and [11] are detected for the absence of markings. This can be seen in FIGS. 5B and 5C. When all of these conditions are present, the start process logic 84 will produce a start pulse, shown in FIG. 5F.

The output from the channel [9] optical detector on line 78 is also sent to a leading edge delay circuit 86 to delay the leading edge of the pulse and produce a logic [9] signal shown in 5E. The logic [9] signal is utilized throughout the logic circuitry to turn on the various circuits. It will be noted that the logic [9] pulse starts after the actual detection of the mark in the channel [9]. The reason for this is that there generally occurs a slight delay in the turn-on of the photofield effect transistors which are utilized as the photodetectors. Therefore, in order to give these photofets a chance to reach their steady state value, the logic circuitry, which would operate faster than the photodetectors, is delayeld in their operation. Thus, the logic [9] signal in FIG. 5E is delayed from the optical 9 signal shown in FIG. 5A.

It is therefore noted tha the logic [9] signal at the output of the leading edge delay 86 is also utilized to synchronize the start process logic circuit 84. This can be noted wherein the start pulse shown in FIG. 5F commences at the same time as the logic [9] signal. Of course, the start pulse terminates once the rear portion of the markings occur with the presence of a mark in channels [7] and [11], as shown in FIG. 5C.

Accordingly, the start pulse occurs in accordance with the following formula:

$$\text{Start Pulse} = [9] \times ([8] + [10]) \times (\overline{[7]} \times \overline{[11]})$$

The logic for producing the start pulse is easily obtained by one skilled in the art once the above formula for the logical product is known.

The logic [9] pulse at the output of the leading edge delay 86, as shown in FIG. 5E, is also sent on line 90 to a series of channel latching and inverting circuits 92. Since the various indicating marks, encoding marks, etc., do not all occur simultaneously, it is necessary that the information from the automatic threshold circuits all be retained in latching circuitry. Thus, the logic [9] pulse causes the information from the photodetectors, which is passed through the preamplifiers, to become simultaneously latched. It should first be noted that only 15 channels of information are provided into the latch 92. Information from channel [9] is only a control and provides no identifying information. Accordingly, the information from that channel is not stored in the latching circuitry. It should further be noted that there is a slight delay at the input 94 to the latching circuitry. This delay will hereinafter be explained. The delay latch signal is shown in FIG. 5I wherein the slight delay in the entire signal can be noted so that both the leading and trailing edges are moved slightly past the logic [9] pulse of FIG. 5E.

The logic [9] signal from the leading edge delay circuit 86 is also sent to a pulse differentiater circuit 88. This circuit differentiates both the leading and trailing edges of the pulse (FIG. 5E) coming from the leading edge delay circuit 88. The leading edge differentiated pulses are shown in FIG. 5G, and the trailing edge differentiated pulses are shown in FIG. 5H. The differentiated pulse from the differentiator 88, together with the start pulse at the output of the start process logic circuit 84, are both utilized as a clock input to a shift register, identified as program shift register 96. Effectively circuit 96 is a three bit shift register which initially is in the state "000". With the production of the first clock signal resulting from the start process logic circuit 84, the register is shifted into state "001". This is referred to as the α state. Subsequently, reference will be had to the β state, when the register is shifted to a "010" state, and finally the γ state referring to shifting of the register to a state "100".

With receipt of the start pulse at the clock input to the program shift register 96, the α state is entered with an output shown in FIG. 5K. This signal opens the gate 98 so that at the occurrence of the next output of the pulse differentiator circuit 88, which is the pulse in FIG. 5H, it will pass through the gate 98 and energize the parallel load (p1) input of the address counter 100. This signal is shown in FIG. 5N.

The information on 6 of the channels which are stored in the latching circuitry 92 will pass through the initial address encoder 102. The six channels include the two channels having the meal identification code, as well as the four channels having the diet identification code. The encoder 102 will encode this information and send it to the address counter 100, which is a 10 bit binary counter. The information is loaded upon receiving the parallel load signal from the gate 98.

The address counter 100 is connected to a 12K memory 104 which contains memory locations corresponding to all of the 45 different menu items for each of the 16 different menu formats. The particular meal and menu format which is decoded and sent to the address counter 100 will select the particular memory address in the memory 104 and have those locations ready for further use, as will hereinafter be described.

It should be noted that the information from the latching circuits 92 do not pass into the 16 bit shift register 106 at this point. Although the output from the pulse differentiator 88 is sent to the parallel load input of the shift register 106, since no subsequent clocks are sent to shift register 106, no shifting will occur. Therefore, the information will remain in the latching circuitry.

At this point, the first phase of the detection has been completed. Specifically, the channel [9] marking was detected which then turned on all of the other light emitting diodes. The markings encoding the meal and diet information are detected and latched. The information from the six channels containing the identifying information is then encoded and placed in the address counter which selects the proper part of the memory to be subsequently acted upon.

It should be remembered that the menu is continuously moving passed the detectors. All the aforementioned information being registered during the time the first row of markings pass under the detectors. Then, once that first row has passed the detectors and the channel [9] marking no longer detected, the light emitting diodes will turn off and wait until further markings are detected.

The menu continues moving until the second row is reached containing specific selection marks in boxes. At that point, again, a signal is detected on channel [9] by the active channel [9] detector. A pulse is again sent on line 74 through the inverter 76 to the trailing edge delay 80, as shown by the FIG. 5A, to produce the pulse shown in FIG. 5D which drives the other 15 light emitting diodes so that they can now detect the specific marks placed in the boxes representing the desired food items. The detected mark in channel [9] also passes through the leading edge delay 86 to produce the logic [9] signal 5E which causes the signals detected to pass into the latching circuits 92. It should be noted that the start process logic 84 will not produce any output since the previously indicated formula will not be achieved with the specific presence and absence of the designated marks in particular channels.

The logic [9] signal from the leading edge delay 86 will pass into the pulse differentiator 88 to again produce pulses at the leading and trailing edges of the logic [9] signal. The leading edge of the pulse, shown in 5G will terminate the α state of the shift register 96 and place it into the β state. Although the β state has no effect on the activities of other logic parts of the circuitry, since a shift register is utilized the signal must delay through the middle β state in order to let the shift register reach the third γ state which is utilized. The clock input to the program shift register is shown in FIG. 5J.

When the logic [9] signal from the leading edge delay 86 reaches its trailing edge, the differentiated output pulse shown in FIG. 5H will now place the program shift register into its γ state. This sends an enable signal to the clock generator 108 which sends clock signals shown in 5P to the accumulator sequencer 110. The accumulator sequencer 110 is actually a 4-bit register, and the clock generator can be an oscillator circuit.

The output from pulse differentiator circuit 88 is also sent as a parallel load signal (PL) to the 16-bit shift register 106. This time, the information from the latching circuit 92 is transferred to the shift register 106 in parallel because a clock signal is provided from the accumulator sequencer 110. The information is retained for a use as will be explained.

The information from the latching circuit 92 first passes to the shift register 106. The signal to the shift register 106 comes from the pulse differentiator 88 which differentiates the logic [9] signal at the output of the leading edge delay 86. If both the latching circuit 92 and the shift register 106 were simultaneously energized, it might occur that the shift register would be slightly ahead, and the information may already be wiped out of the latching circuit before it has shifted into the shift register. Therefore, the logic [9] signal is slightly delayed prior to its entry into the latching circuit 92 so that it will remain in the latching circuit slightly longer to thereby allow the shift register 106 to parallel load the information therein before the information is wiped out of the latching circuitry 92. This delayed latch signal is shown in FIG. 5I.

The address counter 100 is arranged so that upon detection of a breakfast meal code, there is hard wired a pulse in a first addressed position representing a sheet count. This signal along line 112 is also sent into the shift register. It is therefore understood that although there are only 15 channels of information from the latching circuits 92, there is provided a 16 bit shift register. The first bit represents a sheet count and is automatically entered when a breakfast code is read.

The accumulator sequencer 110 recycles into four states. In the first state, designated as Q1, a pulse is sent to the parallel load (PL) of an accumulator 114 which can be an increment counter. Accumulator 114 has the capabilities of carrying 3 binary coded decimal numbers. The signal to the accumulator 114 transfers the information from the first addressed memory location of memory 104 into the accumulator. It should be remembered that the address counter 100 contains the address of the particular meal and diet code. It accordingly selected from the memory 104 the proper memory location associated with the particular diet menu. Then, for a breakfast it started with the "00" location. For lunch it would start the memory at the "15" food item location, and for dinner it would start the memory at the "30" food item location. Therefore, when the clock pulse comes to the accumulator 114, it transfers the first food item for the particular meal from the memory 114 into the accumulator 114. The memory is normally held in a read mode and therefore the parallel load signal to the accumulator 114 automatically transfers the information from that memory location into the accumulator.

The second state of the accumulator sequencer Q2, enables the gate 116 of the clock input to the accumulator 114. If a mark had been placed on the menu selecting that particular food item from the meal, a corresponding signal would be present in the shift register for that location. That signal would then pass through the gate 116 and add one count to the information contained in the accumulator 114. Thus, the previous count is incremented by one corresponding to the particular food item presently selected.

The third pulse from the accumulator sequencer Q3, is sent through the read/write gate 118 causing the information from the accumulator to be transferred back to the same location in the memory. Thus, the updated information count of the particular food item is now replaced in memory. It is understood that if the particular food item had not been selected on the menu, no increment count would have been added in the accumulator since no pulse would have been present in the shift register, and accordingly the previous count would be returned back to the memory without any change.

The fourth pulse from the accumulator sequence Q4, clocks the shaft register 106 to move it to its next position representing the next food item. At the same time, it also is sent to clock the address counter 100 to move to its next position whereby the next memory location is addressed.

The above sequence continues for all of the 15 items contained in that particular meal for the particular identified menu type. After repeating the steps 15 times, on the 16th time the sequential circuits are reset through the end-of-processing logic circuit 120. This logic circuit receives continuously the Q3 pulse, and also receives the address of the food item from the address counter 100. The reset pulse is produced from the end-of-processing logic circuit 120 when the following equation is achieved:

$$\text{Reset} = Q_3 (\bar{A}_5\bar{A}_4 A_3 A_2 A_1 A_0 + \bar{A}_5 A_4 A_3 A_2 A_1 \bar{A}_0 + A_5 \bar{A}_4 A_3 A_2 A_1 \bar{A}_0)$$

where $A_i = i^{th}$ address line output of the Address Counter.

The above formula indicates that the reset pulse will be provided when the Q3 pulse occurs and at the same time when the address of the food item is either "15", "30" or "45". The numbers in the parenthesis represent the binary codings of these digital numbers. This indicates that all of the food items for a particular meal have been updated. If it was breakfast, the memory started at the zero location and went through to item 15. If it was lunch, the memory started from item 15 and proceeded through item 30, and for dinner it went from item 30 to item 45. Then, at the next Q3 pulse the reset will occur. The particular logic circuit required to carry out the above formula is easily designed by one skilled in the art once the above formula is known. The reset pulse from the end-of processing logic circuit 120 is sent to the automatic sequencer 110 to stop the clock pulses and is also sent to the program shift register 96 to terminate the γ state.

The timing for the accumulator sequencer operation is shown in FIGS. 5Q through 5T for the respective four states Q1 through Q4.

It will therefore be appreciated that after the first row of markings on the menu, wherein the initializing had occurred, the second row of markings is detected containing the specific desired items. During the initializing operation, the particular meal had been identified and the memory had been selected so that the proper address is ready for the particular meal and diet menu. During the recording part of the operation, when the information for the desired food items is being detected, the information in the memory is updated to increase the count of the items based upon the particular foods desired from that meal on that menu.

The above process continues as each particular menu is fed into the system. If the menu contains three panels, as was shown in FIG. 3, then the above process continues for the three meals for that diet menu and then receives the next menu and the process continues. After all of the menus have been processed and recorded, the information now contained in the memory 104 is ready to be tallied and displayed. During this part of the operation the memory 104 is placed in the read mode and the address counter 100 is either indexed manually or automatically by a free running oscillator. When the address output is equal to the binary word "45", indicating the end of a particular food item from a menu, the diet address counter is incremented by "1" count while the item address counter is reset to 0. In this way, all the food items for a particular diet are read sequentially from one diet to the next diet starting from the first food item of that diet and continuing to the end. The diet address counter cycles to the binary state from "0" to "15" for the sixteen different varieties of diet menus available.

More specifically, since most display decoder-drivers operate on binary coded decimal (BCD) numbers, the information from the address counter 104 is converted from binary to BCD in the converter 122. There will be a total of four binary coded decimal numbers needed for the diet and food item address. The multiplexer 121 therefore receives a total of 7 binary coded decimal numbers. Four numbers come from the converter 122 as shown by the 16 bits of information entering therefrom, and 3 binary coded decimal numbers come from the memory 104, as shown by the 12 bits entering from the memory 104. The multiplexer 121 then multiplexes the 7 BCDs to 1 BCD and transfers it to the BCD-to-7 segment decoder and driver circuit 124, of any type well known in the art. This then provides the 7 digit display on the display output 126.

The oscillator 128 provides the pulses for the various parts of the system involved in the output. For example, it provides clock signals through the gate 130 and the OR gate 132 to the address counter 100. At the same time, through the binary counter 134 it provides the gating signals to the multiplexer 121 and also to the binary-to-octal circuit 136 which operates the digit drivers 138 controlling the 7-digit display 126. In this way, the same polling signal which controls the multiplexing unit 121 and the address counter 100 also controls the 7-digit display 126.

The display consists of 7 decimal digits. The two most significant digits indicate the diet number. The next two digits identify the food item number and the last three digits displays the tally count. Because of the multiplexing, each digit is turned on sequentially at a duty cycle of 1/8.

In addition to displaying the information, it is possible to send the information through a printer interface 140 and have it printed out on a printer 142. Of course, other types of displays could be provided. Furthermore, the information could be sent directly to a computer for further processing.

The power supplies and battery chargers are supplied in a separate unit 144 which is interconnected to the various parts of the circuitry as is needed and well known in the art.

In addition to the automatic indexing as described, manual indexing is also possible by means of the switch circuit 146. Within the automatic/manual indexing circuit there is provided an oscillator or a push button type generator. Pulses are then provided in accordance with the manual indexing. These pulses are sent through the OR gate 132 to clock the address counter 100 to again address the memory 104 and index it. The output again is sent through the multiplexer 121 to be displayed on the 7-digit display. Of course, should menus be moving to the apparatus for detection, there is provided an automatic inhibit on line 148 which prevents any tallying or indexing during the time that menus are being read. In this way the tallying operation is inhibited during the detecting and recording operation.

When power is turned on, there is an automatic erase. Turning on of the power sends a pulse from circuit 150 through the OR gate 152. This carries a pulse on line 154 which resets the accumulator 114 to zero. At the same time, it enables gate 130 whereby the oscillator 128 can send pulses through the address counter 100 so that it will be indexed at high speeds. As it causes the memory to index through its various locations, the zero set in the accumulator will thereby be entered into each of the memory locations. In this manner, the entire memory content will be reset and erased as soon as power is turned on. Additionally, a separate erase switch on line 156 is provided so that at will, an erase pulse can be sent to clear the entire memory.

The erase made must, however, also be inhibited during the course of the processing. So, in the processing mode there is an automatic inhibit provided to the circuitry. The motor is on during the process mode, so the motor-on condition provides the automatic inhibit signal for the tallying and erasing.

When the motor is turned on, a signal is also sent to the gated audio-oscillator circuit 158. Initially, when the motor is first turned on the roller is dark and therefore the detector associated with channel [9] will see a dark signal and, after being inverted by the inverter 76, a positive pulse will be sent to the delay enable gate of the gated audio oscillator 158. This delay, typically 2 minutes, gives enough time for menus to be fed to the detectors. Therefore, if after the motor switch is turned on, no signals are received for two minutes, indicating that the motor has been left on without feeding any menus, the signal will be sent to the audio oscillator 158 which will provide a signal to a speaker. In this way, a warning signal is provided when the motor is left on without feeding any menus to the system.

Summarizing the operation, the apparatus operates as follows: The marked hospital encoded menus are automatically fed through the optical reader. The codes are read and converted into electrical signals. If the codes satisfy a particular logic signal, a pulse is generated to clock the system from a first reset state to an α state, during which initializing takes place. The channel [9] control code activates the detectors to read all data during the period of the channel [9] existence. The codes are read for the menu and meal type, and are placed into the address counter during the first occurence of the channel [9] signal. The breakfast code is also registered to count as a sheet count.

The second channel [9] code together with the various entries made by the user designating the selected food items are then read optically. All the information is converted into logical signals. The channel [9] mark then causes the system to move into its γ state during which recording can take place. The accumulator sequencer then automatically cycles through 16 four state cycles where the information is transferred from the memory to the accumulator for updating by the information from the menu and then re-transferred back to the memory in accordance with the new information. After all the steps have been repeated for a particular meal, the next menu can be read.

After all menus have been read, the tallying mode of operation is entered and the memory is read while the address counter is indexed, whereby all of the food items for each particular diet menu is tallied and displayed.

As was heretofore mentioned, the output from the photodetectors are not all at the same level. Since there are 16 different channels, generally each channel would be at a different height and it would normally be necessary to have 16 different types of comparators. However, since each has its different drift, this would become a very difficult task.

Figure 7:
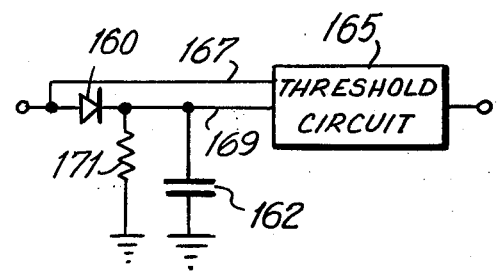
FIG. 7 is a simplified schematic drawing of the automatic threshold circuit.

The present invention provides an automatic threshold circuit which forces each signal itself to set its own threshold signal level. As shown in FIG. 7, the automatic threshold circuit includes a peak detector, shown as the diode 160, in parallel with a capacitor 162. Also, there is provided a threshold circuit 165 to give a fixed threshold. The threshold circuit can be a diode bias, or any other bias, as long as a fixed threshold is provided for each channel.

Figure 6:
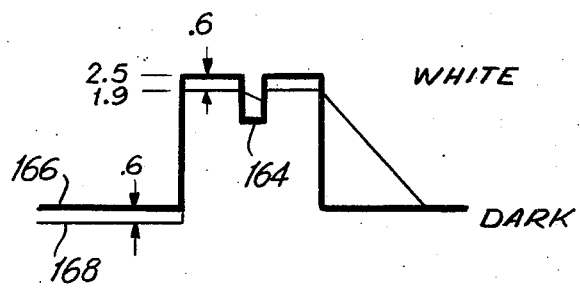
FIG. 6 shows wave forms useful in explaining the automatic threshold circuit.

Referring to FIG. 6, it will be noted how the automatic threshold circuit works. During the dark period, the output is at the low value and when light signals are detected, an upward pulse is read. However, even during the light signals occasionally there is a mark or spot which causes a sudden downward movement as shown at 164 in the center of the curve. The dark curve 166 is the output from the detectors as it enters into the threshold circuit 165 along line 167. The threshold circuit 165 acts as a comparator. The other curve 168 represents the variable voltage reference along line 169. It will be noted that the fixed threshold value shown is 0.6 volts. When diode 160 is conducting: note that curve 168 is always below curve 166 except in the region of 164. The reason is that in region 164, capacitor 162 is discharging slowly through resistor 171, thereby reverse biasing diode 160. Threshold circuit 165 outputs a pulse whenever curve 168 is above curve 166.

Although heretofore there has been described optical detection, it will be apparent that other types of detection could be utilized as, for example, magnetic encoding with magnetic detection or other similar types of encoding technique.

There has been disclosed heretofore the best embodiment of the invention presently contemplated. However, it is to be understood that various changes and modifications may be made thereto without departing from the spirit of the invention.

We claim:

1. A system for processing menus and tallying food items selected from the menus, comprising:
    detection means capable of detecting markings on a menu;
    initializing circuit means responsive to the detection by said detection means of preassigned markings on the menu, for registering information identifying the menu;
    recording circuit means enabled by said initializing circuit means to respond to the detection by said detection means of additional markings on the menu representing the food items selected, and for recording a count for each said food item selected, and
    tallying means for displaying the total count for each food item of each identified menu.

2. A system as in claim 1, wherein said detection means comprises an array of optical detector units, each unit associated with a particular optical path along the menu, said preassigned markings on the menu occurring along certain optical paths, the preassigned markings representing encoded information identifying the menu diet and meal, and said additional markings representing selective marks placed by a user on indicating spaces on the menu, each indicating space located along a respective one of the optical paths and each being associated with a respective food item.

3. A system as in claim 2, wherein each detector unit comprises a light emitting device for directing a light onto the menu along its corresponding optical path, and a photodetector for receiving reflected light from the menu along a corresponding optical path, the reflected light received being a function of the presence or absence of a marking on the menu.

4. A system as in claim 2 and wherein said detection means further comprises an automatic threshold circuit for each optical detector unit for having each detector unit set its own threshold signal level, each automatic threshold circuit comprising a peak detector for detecting a peak signal from the detector unit, a capacitor coupled to the peak detector for retaining the peak signal, and a fixed threshold circuit coupled to the capacitor and peak detector for providing a fixed level below said peak signal.

5. A system as in claim 1, wherein said initializing circuit means further comprises, logic circuit means coupled to said detection means and responsive to particular markings from said preassigned markings for providing a start signal, an address encoder coupled to said detection means for converting the preassigned markings detected into an address representing the menu diet and meal, and an address counter coupled to said address encoder, said address counter responsive to said start signal for registering a particular count corresponding to the menu diet and meal.

6. A system as in claim 5, wherein said address counter produces a sheet count output upon registering a count for a particular preselected meal.

7. A system as in claim 5, wherein said particular markings comprise the combination of the presence and absence of specific marks positioned in respective predetermined paths along the menu, said combination occurring simultaneously along a common line transverse to the paths of the menu whereby skewing error and noise errors are avoided.

8. A system as in claim 1 further comprising storage means for storing signals corresponding to the detected markings, and wherein said recording circuit means further comprises accumulator means coupled to said storage means, memory means coupled to said accumulator means, said memory means being initialized by said initializing circuit whereby said information identifying the menu is registered by the selection of a corresponding part of the memory means, sequencer means enabled by said initializing circuit means for transferring the previous count for each food item on the identified menu from the memory to the accumulator, increasing the count by one where a signal is present in the storage means for that food item, and returning the count for that food item back into the memory, and logic circuit means for resetting said sequencer means when the count of each item on the identified menu has been returned to memory.

9. A system as in claim 1 and further comprising a control detector for detecting the presence of a control mark along an assigned control path on the menu and producing an energizing pulse in response thereto, said energizing pulse controlling the operaton of said detection means, whereby only said control detector need be continuously operative while said detection means are only operative during the presence of the control mark, and wherein the control mark occurs when said preassigned markings and additional markings are present.

10. A system as in claim 9 and further comprising a control circuit responsive to said energizing pulse for producing a control pulse whose width is narrower than said energizing pulse, said initializing circuit becoming operative only upon the occurrence of said control pulse, whereby said initializing circuit avoids delay errors during energization of said detection means.

11. A system as in claim 1 and further comprising latching means coupled to said detecting means for latching signals corresponding to the detected markings, and storage means coupled to said latching means for storing the latched signals to be further used by said recording means, and wherein both said latching means and said storage means are enabled by a common pulse with the pulse to the latching means being delayed.

12. A system as in claim 1 and wherein said recording means comprises a memory means for storing the total count of each item of food for each meal and for each of a plurality of diet menus, said initializing circuit comprises an address counter having encoded signals representing each meal and each of said plurality of diet menus, said address counter being coupled to said memory means, and wherein said tallying means comprises multiplexing means for associating the food item counts from said memory means with the appropriate meal and diet menu, display means coupled to the output of said multiplexing means for displaying the food item counts for each meal and diet menu, and oscillator means coupled to said multiplexing means to said address counter and to said display means for producing clock signals to synchronize their operation.

13. A system as in claim 12 wherein said tallying means further comprises indexing circuit means for indexing said address counter to a desired meal and diet menu address to thereby selectively display the food item counts for the desired meal and diet menu.

14. A system as in claim 12 wherein said recording circuit means further comprises an accumulator coupled to said memory, and further comprising erase circuit means coupled to said accumulator for resetting it to zero, said erase circuit means also enabling said oscillator to rapidly step said address counter through its entire count, whereby all the addressed memory locations will be reset by loading the zero from said accumulator into each memory location.

15. A system in claim 1 and further comprising motor means for moving the menus past the detection means, delay means coupled to said detection means for producing an output signal when a predetermined time interval has elapsed from the last detection of markings on a menu, gating means coupled to said motor means, and delay means for producing a warning signal when the motor is on and said predetermined time interval has elapsed, and warning means for producing an output responsive to said warning signal.

16. A system as in claim 1 and further comprising a housing, an input storage tray on said housing for holding a stack of menus to be tallied, drive means for sequentially feeding the menus individually past said detection means, an output collection tray on said housing for receiving the menus after they have been tallied, and a digital readout on said housing coupled to said tallying means for providing the display of the total count of the food items.

17. A menu for use with apparatus for automatically detecting and tallying food items selected therefrom, said menu comprising a plurality of detecting paths, a first transverse row of preassigned markings respectively located in selected ones of said detecting paths, said markings encodingly identifying the menu, and uniform array of indicating spaces arranged in a second transverse row for marking therein by a user to select the food items desired, each indicating space being located in a respective one of the detecting paths and each associated with a respective food item.

18. A menu as in claim 17, wherein the preassigned markings represent encoded information identifying the menu diet and meal.

19. A menu as in claim 17, and further comprising a control detecting path, a control mark provided along said control detecting path in both said first and second rows, and wherein said control mark is adapted to activate the detecting apparatus.

20. A menu as in claim 19, and wherein some of the markings along the first row occupy only a forward portion thereof and other markings occupy on a rearward portion thereof, whereby the front edge of the first row provides a predetermined combination of the presence and absence of markings at specified detecting paths, said combination adapted to start the tallying apparatus, whereby skewing errors and noise errors are avoided.

21. A menu as in claim 19, and wherein the length of said control mark along said second row is less than the length of said indicating spaces, whereby the peripheral edges of the indicating spaces will not be detected.

22. A menu as in claim 17, and wherein said markings are optical markings for detection by optical detectors.

23. A menu as in claim 18, wherein there are provided three consecutively interconnected sections thereon corresponding to three daily meals, each section having its own first row of markings and its own second row of indicating spaces, the preassigned markings on the three sections encodingly identifying a common menu diet and the respective meal for that section, and wherein the indicating spaces on each section are associated with food items appropriate for that respective meal.

24. A method of determining and tallying food items selected from a menu wherein each menu comprises a plurality of detecting paths, a first transverse row of preassigned markings located in said paths for identifying the type of menu, indicating spaces arranged on a second transverse row, each indicating space located in a respective one of the detecting paths and each associated with a respective food item, the indicating spaces containing additional markings representing selections made by a user to represent food items desired, said method comprising the steps of:

(a) detecting the preassigned markings on a menu;
 (b) identifying the menu type from the detected preassigned markings;
 (c) detecting the additional markings on the menu;

(d) recording a count for each food item selected on the menu;

(e) associating the food items with the particular identified type of menu;

(f) tallying the total count for each food item of the various menu types, and (g) displaying the total counts tallied.

25. A method as in claim 1, wherein said menu further comprises a control detecting path with a control mark along the control detecting path in both the first and second rows, the method further comprising the following steps:

monitoring the control detecting path of the menus to detect the presence of a control mark, and energizing the detecting devices only during the presence of the control mark.

26. A method as in claim 24, and wherein said steps of recording further comprises the steps of: latching respective signals onto latching circuits in response to the detection of the additional markings and storing the latched signals into a storage unit, wherein the presence of a signal in the storage unit indicates the selection of a corresponding food item.

27. A method as in claim 26, and wherein said steps of recording further comprise the steps of: selecting from a memory the previous count of a particular food item, transferring that previous count to an accumulator; increasing the count where a signal exists in the storage unit for that corresponding food item; returning the updated count back to the same location in the memory, and interactively repeating the above four steps for each item of food contained on the type of menu identified.

28. A method as in claim 27, and wherein said step of tallying further comprises the steps of indexing the memory for all the food items for all the menu types; and associating the food items with its correspondingly menu type.

29. A method as in claim 24, wherein some of the markings on the menu along the first row occupy only a forward portion thereof and other markings occupy only a rearward portion thereof, said method further comprising the steps of: monitoring the front edge of the first row, and providing a start signal to permit the detection of the additional markings upon determining a preassigned combination of the presence and absence of particular markings along the front edge of the first row.

* * * * *

UNITED STATES PATENT OFFICE
CERTIFICATE OF CORRECTION

Patent No. 4,127,232      Dated November 28, 1978

Inventor(s) Michael Gagliardo, Howard W. Schubert, Malvin P. Rahm and Jackson Lum It is certified that error appears in the above-identified patent and that said Letters Patent are hereby corrected as shown below:

In column 19, claim 25, first line, change "1" to —"24"—.

Signed and Sealed this

Thirteenth Day of May 1980

[SEAL]

Attest:

SIDNEY A. DIAMOND

Attesting Officer      Commissioner of Patents and Trademarks